US009267535B2

(12) United States Patent  (10) Patent No.: US 9,267,535 B2
Jang et al.  (45) Date of Patent: Feb. 23, 2016

(54) SNAP RING HAVING EASILY REPLACEABLE SUPPORT

(71) Applicants: James Jang, Cypress, CA (US); Ricardo Jang, Anaheim, CA (US)

(72) Inventors: James Jang, Cypress, CA (US); Ricardo Jang, Anaheim, CA (US)

(*) Notice: Subject to any disclaimer, the term of this patent is extended or adjusted under 35 U.S.C. 154(b) by 0 days.

(21) Appl. No.: 14/331,475

(22) Filed: Jul. 15, 2014

(65) Prior Publication Data

US 2016/0017912 A1 Jan. 21, 2016

(51) Int. Cl.
*F16B 45/02* (2006.01)
*A01K 75/00* (2006.01)
*A01K 73/02* (2006.01)

(52) U.S. Cl.
CPC ............... *F16B 45/02* (2013.01); *A01K 73/02* (2013.01); *A01K 75/00* (2013.01); *Y10T 24/45361* (2015.01); *Y10T 24/45372* (2015.01)

(58) Field of Classification Search
CPC ....... A01K 75/00; A01K 73/02; A01K 73/12; F16B 45/02; Y10T 24/45361; Y10T 24/45319; Y10T 24/45372
USPC ............ 24/598.1, 598.4, 598.7, 599.1, 599.2, 24/599.4–599.7, 599.9, 600.2; 43/8, 14, 43/104; 114/114; 294/82.19, 82.2
See application file for complete search history.

(56) References Cited

U.S. PATENT DOCUMENTS

| 5,287,645 | A | * | 2/1994 | Gois | 43/14 |
| 5,505,013 | A | * | 4/1996 | Gois | 43/14 |
| 5,864,929 | A | * | 2/1999 | Sakong | 24/600.1 |
| 7,624,483 | B1 | * | 12/2009 | Jang et al. | 24/599.1 |
| 7,743,475 | B2 | * | 6/2010 | Jang et al. | 24/599.9 |
| 8,141,228 | B2 | * | 3/2012 | Gois, Sr. | 29/525.01 |
| 8,359,719 | B2 | * | 1/2013 | Jang | 24/599.9 |
| 2005/0172461 | A1 | * | 8/2005 | Hall | 24/599.9 |
| 2008/0184541 | A1 | * | 8/2008 | Jang et al. | 24/599.9 |
| 2010/0088945 | A1 | * | 4/2010 | Gois | 43/14 |
| 2010/0180411 | A1 | * | 7/2010 | Jang | 24/596.1 |
| 2010/0229364 | A1 | * | 9/2010 | Gois, Sr. | 29/428 |

FOREIGN PATENT DOCUMENTS

KR 100986008 10/2010

* cited by examiner

*Primary Examiner* — Abigail Morrell
(74) *Attorney, Agent, or Firm* — IPLA P.A.; James E. Bame

(57) ABSTRACT

A snap ring having an easily replaceable support reliably supports a purse line and overcome frictional force between the purse line and the snap ring even without having a side roller requiring a complex structure on an end of a main roller. In the snap ring, in lieu of a side roller having a complex structure, the support having a simple structure is provided in at least one of the first and second side parts of a frame such that the support and the main roller can reliably support a purse line and overcome frictional force between the snap ring and the purse line. Furthermore, each of the support and the main roller is configured so as to be separately replaceable with a new one. Thus, even if the support or main roller becomes worn, it can be easily replaced with a new one.

20 Claims, 16 Drawing Sheets

SNAP RING HAVING EASILY REPLACEABLE SUPPORT

BACKGROUND OF THE INVENTION

1. Field of the Invention

The present invention relates generally to snap rings having easily replaceable supports and, more particularly, to a snap ring having an easily replaceable support which can reliably support a purse line and overcome frictional force between the purse line and the snap ring even without having a side roller requiring a complex structure on an end of a main roller.

2. Description of the Related Art

Generally, purse seines are a kind of fishing net and are equipment used for fishing sardines, horse mackerels, mackerels, bonitos, tuna, etc. Such a purse seine and a conventional snap ring are illustrated in FIGS. 1 and 2.

As shown in FIGS. 1 and 2, a purse seine 200 has a rectangular shape, the central portion of which is slightly wider than other portions. A plurality of buoyancy units 202 are provided along the upper edge of the purse seine 200 in order to make it possible for the upper edge of the purse seine 200 to float on water, and bridle chains 205 are provided under the lower edge of the purse seine 200 so as to make it possible for the lower edge of the purse seine 200 to sink under the water surface. By virtue of the buoyancy units 202 and the bridle chains 205, the purse seine 200 can spread in the vertical direction in the water. The purse seine 200 is typically deployed in the water in an approximately circular shape so as to catch fish.

In addition, a purse line 210 which is used to haul in the purse seine 200 which has been deployed in a circular shape is disposed along the lower edge of the purse seine 200. The purse line 210 is coupled to the ends of the bridle chains 205 through connectors which are called snap rings 100. In detail, connection members 207 such as ropes or straps are connected to the ends of the bridle chains 205. Each connection member 207 is connected to a first end of the corresponding snap ring 100. The purse line 210 passes through second ends of the snap rings 140, thereby coupling the purse line 210 to the bridle chains 205.

In order to haul in the purse seine 200, when the purse line 210 is pulled by a hydraulic purse winch provided on a fishing boat 220, the bridle chains 205 of the purse seine 200 are also pulled, and thus fish are confined while the purse seine 200 is hauled in.

However, in the case of the snap ring 100 according to the conventional technique, because of the weight of the fish and the purse seine 200 being hauled in, a relatively large frictional force is generated on the contact surface between the purse line 200 and the snap rings 100, thus inducing extreme abrasion of the surfaces of the purse line 210 and the snap rings 100, possibly resulting in tearing. This seriously interferes with the fishing operation. Furthermore, maintenance costs increase due to frequent replacement of the purse line 210 or the snap ring 100, thus resulting in reduced income.

In an effort to overcome the above-mentioned problems, a snap ring having multiple rollers was proposed in Korean Patent Registration No. 10-0986008 (Date: Sep. 30, 2010) which was filed by the applicant of the present invention. The object of the snap ring having multiple rollers is to reduce frictional force generated on contact surfaces between a purse line and the snap ring.

FIG. 3 illustrates the conventional snap ring having multiple rollers. Referring to FIG. 3, the snap ring 100 for coupling a purse line to a purse seine includes: a frame 110 which has a first end connected to the purse seine and a second end through which the purse line passes; and a plurality of rollers which are rotatably provided in the frame 100 at positions at which the purse line is brought into contact with the frame 100. The multiple rollers include first and second side rollers 141 and 142 which are disposed in opposite side parts of the frame 100, and a main roller 143 which is provided to span the opposite side parts of the frame 110 and is oriented such that opposite ends thereof respectively face the first and second side rollers 141 and 142.

When the purse line is placed through the frame 110, the purse line is positioned such that a first side thereof is brought into contact with either the first side roller 141 or the second side roller 142, and a second side thereof is brought into contact with the main roller 143. In this state, when the purse line is moved, the load of the purse line is distributed to two rollers, for example, the first side roller 141 and the main roller 143, which make contact with the purse line. Further, friction between the purse line and the frame 110 can be reduced by rotation of the first side roller 141 and the main roller 143.

Meanwhile, a ship used for fishing operations generally pitches and rolls very easily in response to conditions of the sea. The purse line connected to the ship is also easily moved forwards, backwards, leftwards or rightwards. In the conventional snap ring 100 having multiple rollers, the first side roller 141 and the main roller 143 or the second side roller 142 and the main roller 143 form a right angle. Thus, when the purse line is disposed on only the first side roller 141 or the second side roller 142, the purse line cannot smoothly slide towards the main roller 143, and the hauling operation is carried out with the purse line being disposed on only the first side roller 141 or the second side roller 142. In this case, the load of the purse line is concentrated on only one portion, that is, the first or second side roller 141 or 142 on which the purse line is disposed, rather than being distributed to two portions, that is, to the first side roller 141 and the main roller 143 or to the second side roller 142 and the main roller 143. Eventually, excessive pressure is applied to the snap ring 100, thus reducing the lifetime of the snap ring 100, thereby resulting in an increase in the replacement costs of the snap ring 100. Furthermore, to install the first side roller 141 and the second side roller 142 in the frame 110, rotating shafts for the respective side rollers and a separate complex structure for fixing each rotating shaft are required. A problem with this is an increase in the manufacturing cost of the snap ring 100.

Furthermore, the conventional snap ring 100 further includes a locking unit 150 which is provided in the frame 110 to open or close a frame opening which is formed in the frame 110 to allow the purse line to be connected to the snap ring 100. The locking unit 150 includes a first cylinder 151 which is hinged at a first end thereof to a part of the frame that corresponds to a first end of the frame opening. A second end of the first cylinder is disposed in the frame 110 at a position corresponding to a second end of the frame opening. The locking unit 150 further includes a second cylinder 160 which slides along the first cylinder 151 to open or close the frame opening.

Furthermore, a guide slot 154 is longitudinally formed in a side surface of the first cylinder 151. A guide pin 180 which is fastened to the second cylinder 160 is moved along the guide slot 154. A first locking depression 155 and a second locking depression 156 are respectively formed in first and second ends of the guide slot 154. The guide pin 180 is locked to the first or second locking slot 155 or 156. While the guide pin 180 moves along the guide slot 154, the second cylinder 160 moves upwards or downwards and opens or closes the frame opening.

During the fishing operation, the operation of hauling in the purse seine must be rapidly carried out, and the operation of longitudinally moving the second cylinder 160 to connect the snap ring 100 to the purse line must also be rapidly conducted. For this, a spring 172 is provided in the first cylinder 151 so that the second cylinder 160 can be automatically moved upwards or downwards. The guide pin 180 can be easily moved into and locked to the first locking depression 155 or the second locking depression 156 by contraction or extension and twisting of the spring 172. Thereby, the second cylinder 160 can be automatically moved upwards or downwards, thus facilitating the operation of opening or closing the frame 110.

However, to make the twisting of the spring 172 possible, for example, first and second coupling depressions 174a and 178a are required to fix opposite ends of the spring 172, so that the overall structure is complex. This increases the production cost. Furthermore, the twisting movement of the spring 172 deteriorates the elasticity of the spring 172, thereby increasing the replacement costs of the parts. (Korean Patent Registration No. 10-0986008)

SUMMARY OF THE INVENTION

Accordingly, the present invention has been made keeping in mind the above problems occurring in the prior art, and an object of the present invention is to provide a snap ring in which an easily replaceable support is provided in either a first side part or a second side part of a frame so that the snap ring can reliably support a purse line and overcome frictional force between the purse line and the snap ring even without having a side roller requiring a complex structure on an end of a main roller.

Another object of the present invention is to provide a snap ring having an easily replaceable support which is configured such that pressure which is applied from a purse line to the support or a main roller is evenly distributed to the support and the main roller rather than being focused on only one side, thus reducing the replacement cost of the parts.

A further object of the present invention is to provide a snap ring having an easily replaceable support which is configured such that an elastic part is not required to be twisted, thus increasing the durability of the elastic part.

In order to accomplish the above object, the present invention provides a snap ring having an easily replaceable support, including: a frame having a first side part; a second side part disposed facing the first side part and connected to the first side part, and a space defined between the first side part and the second side part so that a purse line is placed in the space; a main roller provided spanning a first end of the first side part and a first end of the second side part, the main roller being disposed such that the purse line comes into contact with a circumferential outer surface of the main roller; a frame opening formed in either the first side part or the second side part; and a locking unit openably closing the frame opening.

The snap ring may further include a support provided in at least one of inner surfaces of the first and second side parts that face each other, the support being disposed at an end thereof adjacent to a corresponding end of the main roller. The support may be configured such that a portion of the purse line that comes into contact with the main roller makes contact with the support or a portion of the purse line that comes into contact with the support makes contact with the main roller.

The support may be removably coupled to the first side part or the second side part.

Preferably, an outer surface of the support that makes contact with the purse line may be inclined towards the corresponding end of the main roller.

In addition, a receiving recess may be formed in the inner surface of at least one of the first and second side parts so that the support is disposed in the receiving recess.

Furthermore, shaft coupling holes may be respectively formed in the first and second side parts so that a main shaft functioning as a rotating axis of the main roller is disposed in the shaft coupling holes. A reinforcing protrusion may be provided in a first end of the receiving recess that is disposed adjacent to a side of the corresponding shaft coupling hole. The reinforcing protrusion protrudes into the receiving recess towards a second end of the receiving recess such that a distance between the shaft coupling hole and the receiving recess is increased, whereby force with which the first and second side parts support the main shaft is reinforced.

Moreover, an insert depression may be formed in the end of the support so that the reinforcing protrusion is disposed in the insert depression, wherein the insert depression is disposed inside a circumference of the main roller so that the end of the support is disposed inside the circumference of the main roller.

Preferably, a main shaft functioning as a rotating axis of the main roller may be removably inserted into the first and second side parts.

Furthermore, a protrusion may protrude outwards from at least one of the first and second side parts in a radial direction of the main roller, whereby when the frame comes into contact with a frame of another adjacent snap ring, by virtue of a distance between the outer circumferential surface of the main roller and an outer surface of the protrusion, rotation of the main roller is prevented from being affected by the adjacent snap ring.

The snap ring may further include an auxiliary roller provided spanning a second end of the first side part and a second end of the second side part.

The locking unit may include: a first cylinder having a first end rotatably coupled to a portion of the frame that corresponds to a first end of the frame opening, and a second end facing a portion of the frame that corresponds to a second end of the frame opening; and a second cylinder movably fitted over the first cylinder, the second cylinder sliding along the first cylinder and opening or closing the frame opening.

Furthermore, a coupling guide may be provided on the second end of the first cylinder. A locking part may be provided on the frame at a position facing a second end of the frame opening such that the locking part faces the coupling guide. When the first cylinder is rotated in a normal direction and the second end of the first cylinder is disposed in the second end of the frame opening, the second cylinder slides towards the second end of the frame opening and receives the coupling guide and the locking part. When the first cylinder is rotated in a reverse direction and the second end of the first cylinder is moved away from the second end of the frame opening, the second cylinder slides towards the first end of the frame opening and releases the coupling guide and the locking part.

In addition, an end of the coupling guide and an end of the locking part that faces the end of the coupling guide may respectively have a first inclined surface and a second inclined surface. The second inclined surface may be oriented facing an inside of the frame so that the first cylinder is prevented from moving out of the frame when the first cylinder rotates and the first inclined surface comes into contact with the second inclined surface.

The coupling guide and the locking part may be coupled to each other in an engagement coupling fashion.

Furthermore, a guide slot may be formed in a side surface of the first cylinder in a longitudinal direction of the first cylinder, and a guide pin may be disposed in the guide slot and coupled to the second cylinder, wherein the guide pin moves along the guide slot to move the second cylinder.

The guide slot may include: a first guide slot extending a predetermined length in the longitudinal direction of the first cylinder; and a second guide slot extending a predetermined length from a first end of the first guide slot that corresponds to the first end of the frame opening in a direction in which the second cylinder rotates on its own axis.

In addition, a receiving space may be formed in the first cylinder, and the elastic unit may be disposed in the receiving space. The elastic unit may include: an elastic part having a first end supported by the first cylinder in a first end of the receiving space that faces the first end of the first cylinder, and a second end disposed in a second end of the receiving space; and a movable part disposed on a second end of the elastic part, with a receiving hole formed in the movable part so that the guide pin is disposed in the receiving hole. When the guide pin moves from the second guide slot and enters the first end of the first guide slot, the guide pin is automatically moved along the first guide slot towards a second end of the first guide slot by elastic force of the elastic part. When the guide pin moves from the first guide slot and enters an end of the second guide slot, the guide pin is pushed to the end of the second guide slot by the elastic force of the elastic part so that the guide pin is prevented from being moved towards the first guide slot.

The first guide slot may be slanted with respect to the longitudinal direction of the first cylinder.

Furthermore, a stop portion may be formed in the end of the second guide slot. The stop portion may be concave towards the second end of the first cylinder. When the guide pin is disposed in the end of the second guide slot, the guide pin is locked to the stop portion by the elastic force of the elastic part.

In addition, a fixing portion may be formed in the second end of the first guide slot and is concave such that the fixing portion encircles a circumference of the guide pin. When the guide pin is disposed in the second end of the first guide slot, the guide pin is fixed in place by the fixing portion without being moved leftwards or rightwards.

The guide slot may further include: a connection slot extending from the second end of the first guide slot in the direction in which the second cylinder rotates on its own axis; and a third guide slot extending from an end of the connection slot towards the second end of the frame opening.

Furthermore, a stop portion may be formed in the end of the connection slot. The stop portion may be concave in a direction opposite to the third guide slot. When the guide pin is moved from the third guide slot towards the connection slot, the guide pin is locked to the stop portion.

BRIEF DESCRIPTION OF THE DRAWINGS

The above and other objects, features and advantages of the present invention will be more clearly understood from the following detailed description taken in conjunction with the accompanying drawings, in which:

FIGS. 11A and 11B are views illustrating a process of removing the support from the snap ring according to the preferred embodiment of the present invention;

DESCRIPTION OF THE PREFERRED EMBODIMENTS

Hereinafter, a snap ring having an easily replaceable support according to a preferred embodiment of the present invention will be described in detail with reference to the attached drawings.

Figure 1:
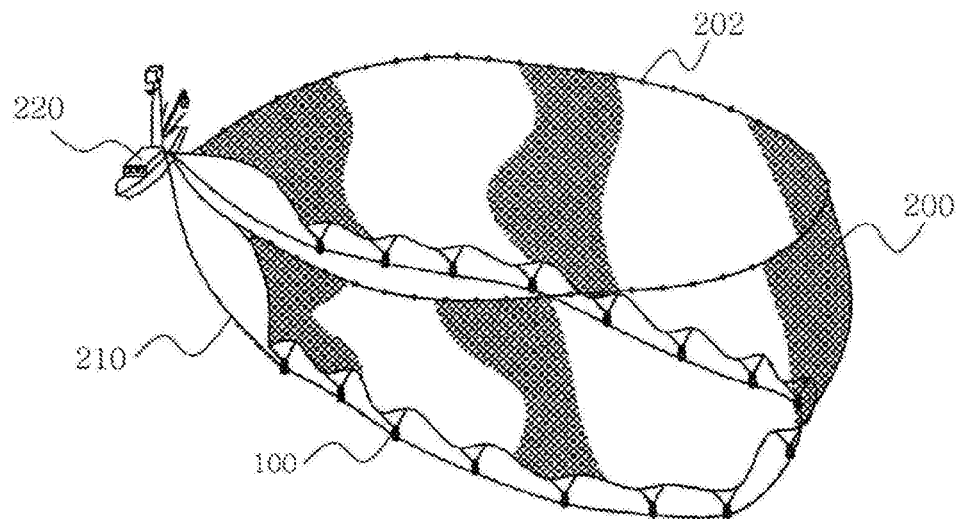
FIG. 1 is a perspective view illustrating a typical purse seine.
Figure 2:
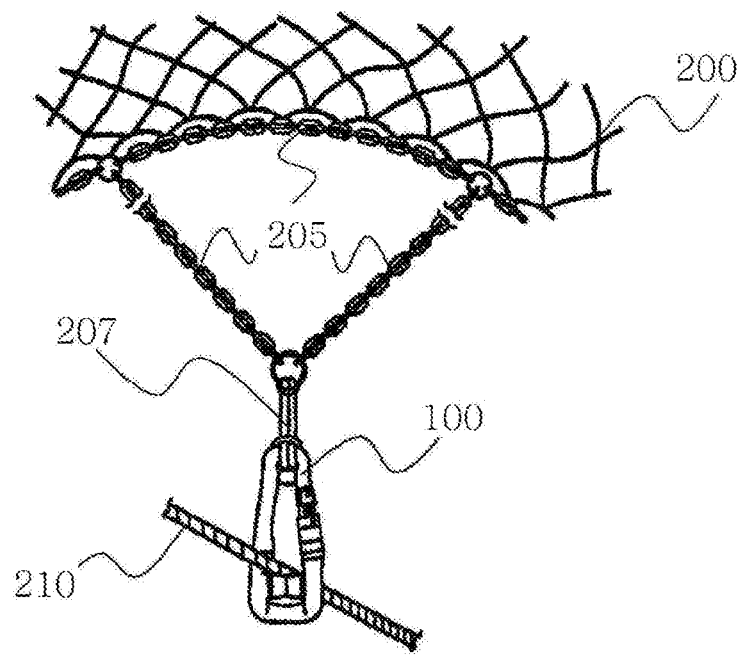
FIG. 2 is a perspective view showing a conventional snap ring.
Figure 3:
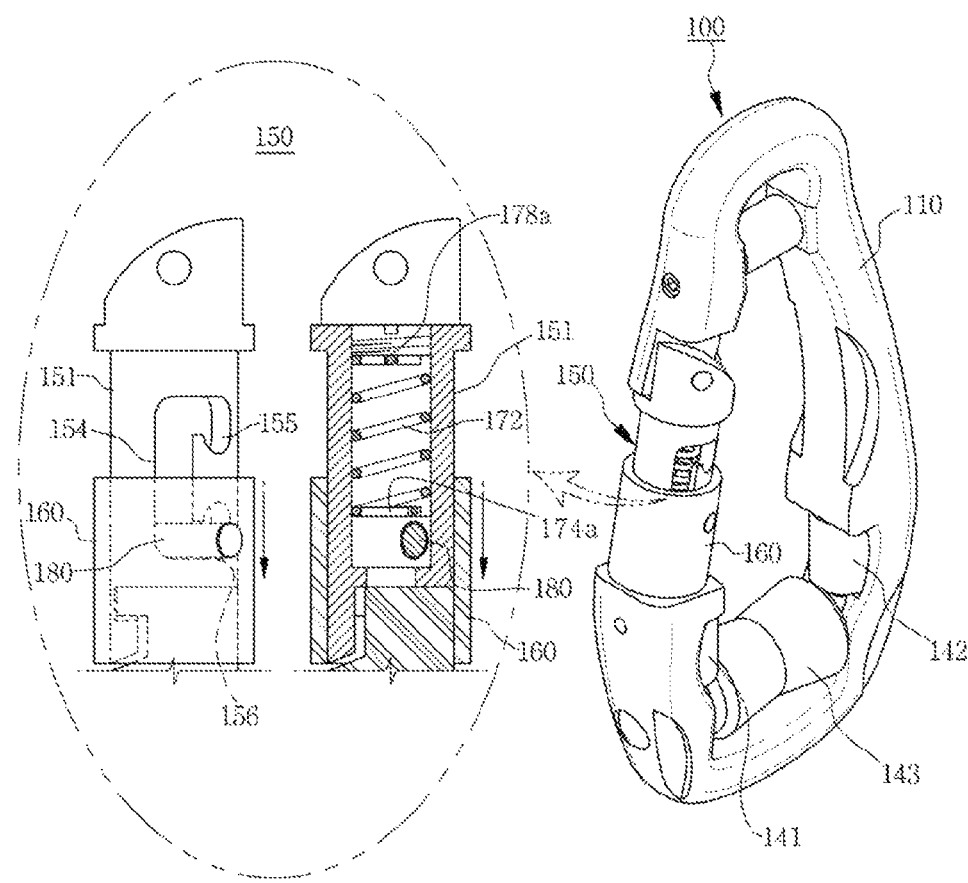
FIG. 3 illustrates a conventional snap ring having multiple rollers.
Figure 4:
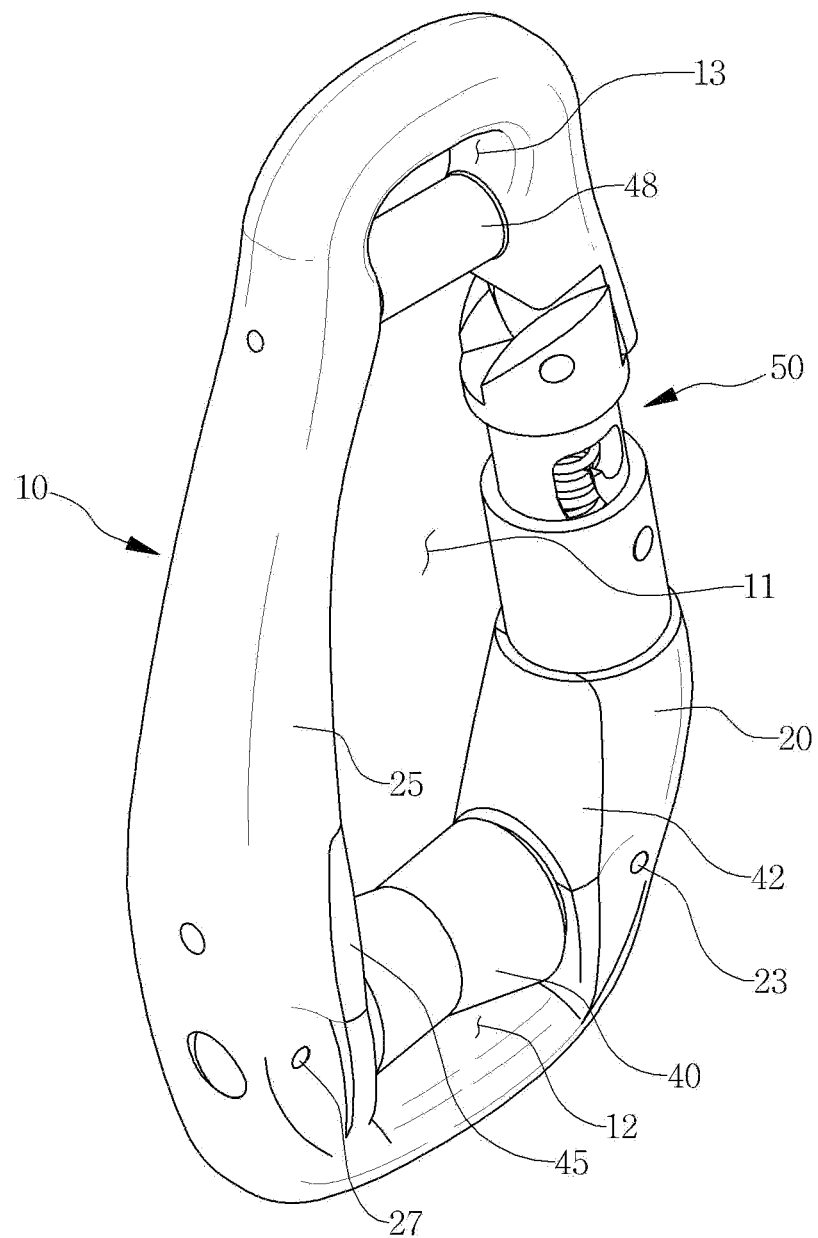
FIG. 4 is a view illustrating a snap ring having an easily replaceable support, according to a preferred embodiment of the present invention.

FIG. 4 is a view illustrating a snap ring having an easily replaceable support, according to a preferred embodiment of the present invention. Referring to FIG. 4, the snap ring according to the preferred embodiment of the present invention is used to connect a purse seine (not shown) to a purse line (210; refer to FIG. 7) when performing commercial fishing. The snap ring includes a frame 10, a locking unit 50, a main roller 40, first and second supports 42 and 45 and an auxiliary roller 48.

Preferably, the frame 10 has an elliptical shape such that the purse line 210 can pass through the frame 10. Furthermore, the frame 10 may have a circular or polygonal shape, as long as the purse line 210 can sufficiently pass through the frame 10. In detail, the frame 10 includes a first side part 25 which extends a predetermined length, a second side part 25 which is disposed facing the first side part 20 and is connected to the first side part 20, and space which is defined between the first side part 20 and the second side part 25. The space includes a first space 11, a second space 12 and a third space 13. The first, second and third spaces 11, 12 and 13 are not independent spaces but are spaces that are formed by partitioning an integrated single space defined by the frame 10 into several spaces based on the purpose of use. The first space 11 is a hollow space, which is defined in a central portion of the frame 10 to allow the purse line 210 to pass through the frame 10. The purse line 210 is disposed in the frame 10 through the first space 11 such that the purse line 210 is brought into contact with the main roller 40, which will be explained later. The second space 12 is a hollow space, which is defined between the main roller 40 and a lower end of the frame 10 by the installation of the main roller 40 in the frame 10. By virtue of the second space 12, the main roller 40 can be smoothly rotated. The third space 13 is a hollow space into which a connection member (not shown) such as a rope which is coupled to one end of a bridle chain connected to the purse seine is inserted when the connection member is coupled to an upper end of the frame 10. The third space 13 is defined between the auxiliary roller 48 which will be described later herein and an inner surface of the upper end of the frame 10. As such, the connection member is disposed in the frame 10 through the third space 13.

A frame opening (15; refer to FIG. 5) is formed in the frame 10 above the first side part 20 so that the purse line 210 can be inserted into the first space 11 of the frame 10 through the frame opening 15.

The locking unit 50 functions to open or close the frame opening 15, and this will be described in detail later.

The main roller 40 serves to reduce frictional force which is generated at contact surfaces between the purse line 210 and the snap ring by the weight of the fish and the purse seine being hauled in when a hydraulic purse winch pulls the purse line 210 to land fish caught in the purse seine. The main roller 40 is disposed below the first space 11 in such a way that the main roller 40 spans the lower ends of the first and second side parts 20 and 22 of the frame 10.

A first support 42 extends a predetermined length along the first side part 20 and is disposed above a first end of the main roller 40. A second support 45 extends a predetermined length along the second side part 25 and is disposed above a second end of the main roller 40. As a result, the opposite ends of the main roller 40 are respectively disposed adjacent to the first support 42 and the second support 45. As needed, only either the first support 42 or the second support 45 may be provided, or both may be provided.

When the first and second supports 42 and 45 are respectively installed in the first and second side parts 20 and 25, lower ends of the first and second supports 42 and 45 are disposed inside the outer circumference of the main roller 40. Therefore, space is not defined between the main roller 40 and the first or second support 42 or 45. Thereby, while the purse line 210 that has been disposed on the first or second support 42 or 45 is moved towards the main roller 40 or the purse line 210 that has been disposed on the main roller 40 is moved towards the first or second support 42 or 45, the purse line 210 is prevented from making contact with the inner surface of the first or second side part 20 or 25. As a result, the inner surface of the first or second side part 20 or 25 can be effectively prevented from being worn via friction attributable to contact with the purse line 210.

A first inclined surface 42b and a second inclined surface 45b are respectively formed on outer surfaces of the first and second supports 42 and 45 that face each other. Extending upwards from lower ends of the outer surfaces of the first and second supports 42 and 45 that face the main roller 40, the first and second inclined surface 42b and 45b are inclined towards inner surfaces of the first and second supports 42 and 45, that is, towards the frame 10. Thereby, the distance between the first support 42 and the second support 45 is reduced towards a lower end of the first space 11. Therefore, when the purse line 210 is disposed on the first support 42 or the second support 45, it smoothly slides towards the main roller 40 along the first or second inclined surface 42b or 45b. The load of the purse line can be reliably distributed to the first support 42 and the main roller 40 or to the second support 45 and the main roller 40. This will be described in more detail later herein with reference to FIG. 7.

The auxiliary roller 48 is disposed in the upper end of the frame 10 in a lateral direction to span the opposite side parts of the inner surface of the upper end of the frame 10. The third space 13 is defined between the inner surface of the upper end of the frame 10 and the auxiliary roller 48. When the connection member (not shown) that is coupled to the purse seine is connected to the upper end of the frame 10, the connection member can be easily inserted into the third space 13, thus facilitating the operation of connecting the connection member to the upper end of the frame 10. The auxiliary roller 48 makes contact at an upper portion thereof with the connection member and rotates, thus reducing frictional force between the frame 10 and the connection member. This provides the effect of extending the lifetime of the connection member. Furthermore, the auxiliary roller 48 is configured such that when the purse seine is deployed along the purse line 210 the auxiliary roller 48 is brought into contact with the purse line 210 that passes through the frame 10 and is rotated, thus reducing friction between the purse line 210 and the frame 10, thereby reducing the replacement costs of the parts.

The main roller 40 may have a cylindrical shape or a bow tie or hourglass shape, which is reduced in diameter from the opposite ends thereof to the central portion. Preferably, each of the frame 10 and the main roller 40 may be made of, for example, stainless steel or a galvanized alloy capable of withstanding force applied to the snap ring during fishing, or a corrosion-resistant alloy or a material having sufficient mechanical strength.

Hereinafter, the structure of coupling the first support 42, the second support 45, the main roller 40 and the auxiliary roller 48 to the frame 10 will be explained in detail.

Figure 5:
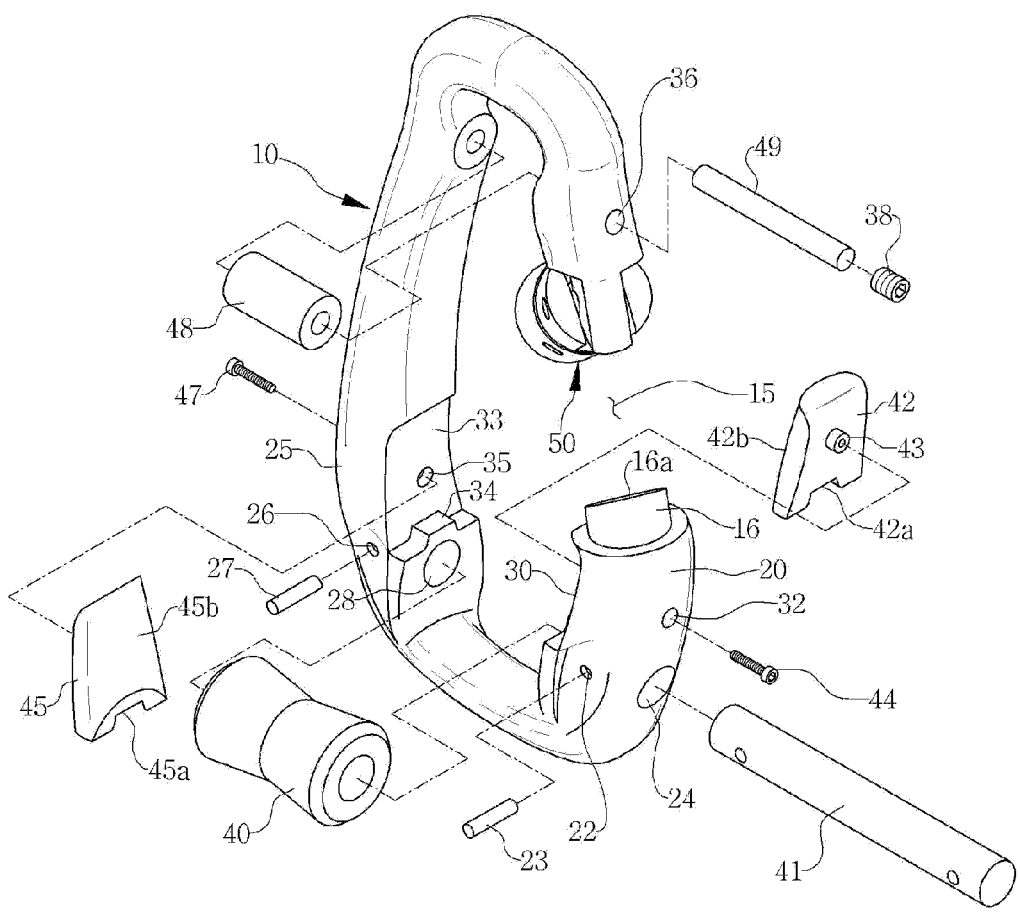
FIG. 5 is an exploded perspective view illustrating the snap ring according to the preferred embodiment of the present invention.
Figure 6:
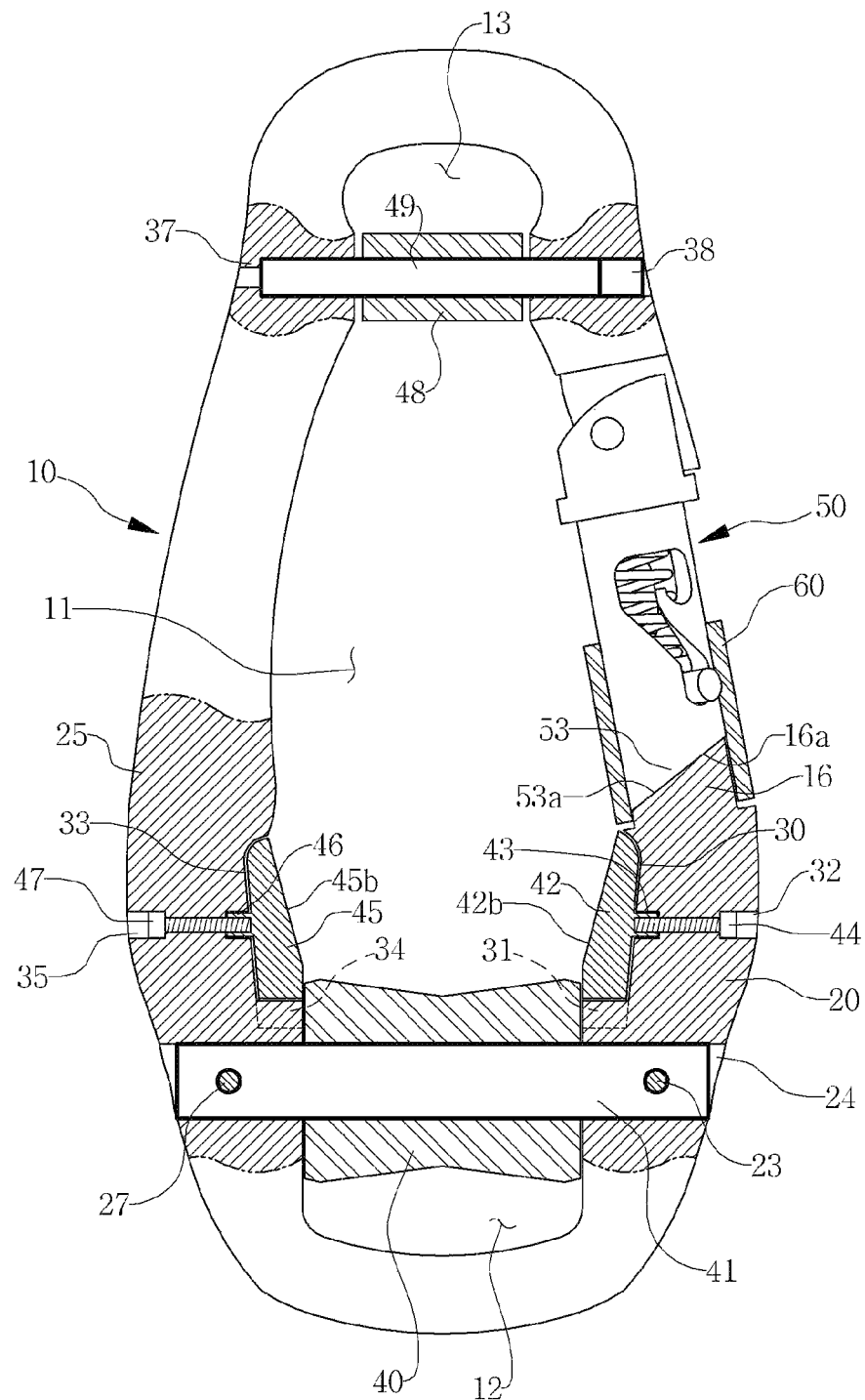
FIG. 6 is a sectional view illustrating the snap ring according to the preferred embodiment of the present invention.

FIG. 5 is an exploded perspective view illustrating the snap ring according to the preferred embodiment of the present invention. FIG. 6 is a sectional view illustrating the snap ring according to the preferred embodiment of the present invention.

Referring to FIGS. 5 and 6, the snap ring according to the preferred embodiment of the present invention includes the first support 42, the second support 45, the main roller 40 and the auxiliary roller 48.

The first support 42 is provided in the first side part 20 of the frame 10 to reduce the frictional force between the frame 10 and the purse line 210 that is inserted into the first space 11 of the frame 10 and placed on the lower end of the inner surface of the frame 10. A first receiving recess 30 is formed in the lower end of the first side part 20 of the frame 10 so that the first support 42 can be provided in the first side part 20. The inner surface of the first support 42 is disposed in the first receiving recess 30. To fasten the first support 42 in the first receiving recess 30, a first fastener 44 is removably coupled to the first support 42 through the first side part 20. For this, a first through hole 32 is formed in the first side part 20 from the outer surface of the first side part 20 towards a first insert part 43 of the first support 42. The first fastener 44 is inserted into the first side part 20 through the first through hole 32. The first insert part 43, into which the end of the first fastener 44 is inserted via the first through hole 32, is formed on the inner surface of the first support 42 so that the first fastener 44 is inserted into and coupled to the first insert part 43 of the first support 42 through the first through hole 32. In this embodiment, a bolt or the like is used as the first fastener 44. Thus, the first fastener 44 is threaded and tightened into the first insert part 43 through the first through hole 32. To replace the first support 42 that has been worn with a new one, the first fastener 44 is loosened and removed from the first insert part 43 and the first through hole 32, thus enabling the first support 42 to be easily replaced with a new one. This will be explained later herein with reference to FIG. 11.

The second support 45 has the same structure as that of the first support 42. Briefly, the second support 45 is disposed in a second receiving recess 33 formed in the lower end of the second side part 25 of the frame 10. A second insert part 46 into which a second fastener 47 is inserted is formed on the inner surface of the second support 45. A second through hole 35 is formed in the second side part 25 from the outer surface of the second side part 25 towards the second insert part 46. The second fastener 47 is threaded and tightened into the second inserted part 46 through the second through hole 35, whereby the second support 45 is removably coupled to the second receiving recess 33.

The main roller 40 is provided in the lower end of the frame 10 in such a way that the main roller 40 spans the lower ends of the first and second side parts 20 and 25. For this, a first shaft coupling hole 24 and a second shaft coupling hole 28 are respectively formed in the first side part 20 and the second side part 25 of the frame 10 in a direction from the outer periphery of the frame 10 to the inner periphery thereof. Functioning as a rotating axis of the main roller 40, a main shaft 41 is integrally disposed in the first shaft coupling hole 24 and the second shaft coupling hole 28. The main roller 40 is fitted over the main shaft 41. A first fastening hole 22 and a second fastening hole 26, which respectively communicate with the first shaft coupling hole 24 and the second shaft coupling hole 28, are respectively formed in the outer surfaces of the lower ends of the first and second side parts 20 and 25. A first fastening pin 23 and A second fastening pin 27 are removably inserted into the main shaft 41 through the first fastening hole 22 and the second fastening hole 26, respectively, so that the main shaft 41 that has been disposed in the first and second side parts 20 and 25 can be prevented from being undesirably removed from the first and second side parts 20 and 25.

While the main roller 40 is disposed on the lower ends of the first and second side parts 20 and 25, the first and second supports 42 and 45 are respectively provided above first and second ends of the main roller 40. For this, the first and second shaft coupling holes 24 and 28 are respectively formed in the lower ends of the first and second side parts 20 and 25 to install the main roller 40 on the lower ends of the first and second side parts 20 and 25. Furthermore, the first and second receiving recesses 30 and 33 are respectively formed in the inner surfaces of the first and second side parts 20 and 25 above the first and second shaft coupling holes 24 and 28. The first and second supports 42 and 45 are respectively disposed in the first and second receiving recesses 30 and 33 in such a way that the inner surfaces of the first and second supports 42 and 45 face the first and second receiving recesses 30 and 33.

Meanwhile, with regard to the main shaft 41 that is disposed in the first and second shaft coupling holes 24 and 28, as the length, that is, the area, of a portion of each of the first and second side parts 20 and 25 that surrounds the corresponding shaft coupling hole 24, 28 is increased, the force with which the first and second side parts 20 and 25 supports the main shaft 41 that is disposed in the first and second shaft coupling holes 24 and 28 is also increased. However, the first and second receiving recesses 30 and 33 for installation of the first and second supports 42 and 45 are respectively formed in the first and second side parts 20 and 25 above the first and second shaft coupling holes 24 and 28. In addition, the distance between each receiving recess 30, 33 and the corresponding the shaft coupling hole 24, 28 is so short that the lower end of the receiving recess 30, 33 is disposed inside the circumference of the main roller 40. Thus, the force with which the first and second side parts 20 and 25 support the main shaft 41 may be insufficient. To solve this problem, in the present invention, first and second reinforcing protrusions 31 and 34 respectively protrude upwards from lower ends of the first and second receiving recesses 30 and 33 such that the distance between each of the first and second shaft coupling holes 24 and 28 and the corresponding reinforcing protrusion 31, 34 is sufficiently long. Furthermore, first and second insert depressions 42a and 45a are respectively formed in the lower ends of the first and second supports 42 and 45 which are respectively disposed in the first and second receiving recesses 30 and 33, so that the first and second reinforcing protrusions 31 and 34 are respectively inserted into the first and second receiving recesses 30 and 33. Here, the upper ends of the first and second reinforcing protrusions 31 and 34 are disposed inside the circumference of the main roller 40 such that the lower ends of the first and second supports 42 and 45 are also disposed inside the circumference of the main roller 40. The reason for this is to enable the purse line to directly move from the first or second support 42 or 45 to the main roller 40 or from the main roller 40 to the first or second support 42 or 45.

The auxiliary roller 48 is provided in the upper end of the frame 10 in a lateral direction to span the opposite side parts of the inner surface of the upper end of the frame 10. An auxiliary through hole 36 is formed in the upper ends of the first and second side parts 20 and 25 of the frame 10. An auxiliary shaft 49 which functions as a rotating axis of the auxiliary roller 48 is inserted into the auxiliary through hole 36. The auxiliary roller 48 is rotatably fitted over the auxiliary shaft 49.

A stop portion 37 is provided in a first end of the auxiliary through hole 36 so that a first end of the auxiliary shaft 49 is blocked by the stop portion 37. A removal prevention member 38 that has a cap shape is fitted into a second end of the auxiliary through hole 36 so as to prevent the auxiliary shaft 49 from being undesirably removed from the auxiliary through hole 36, whereby the auxiliary shaft 49 can be reliably fixed in the auxiliary through hole 36.

Figure 7:
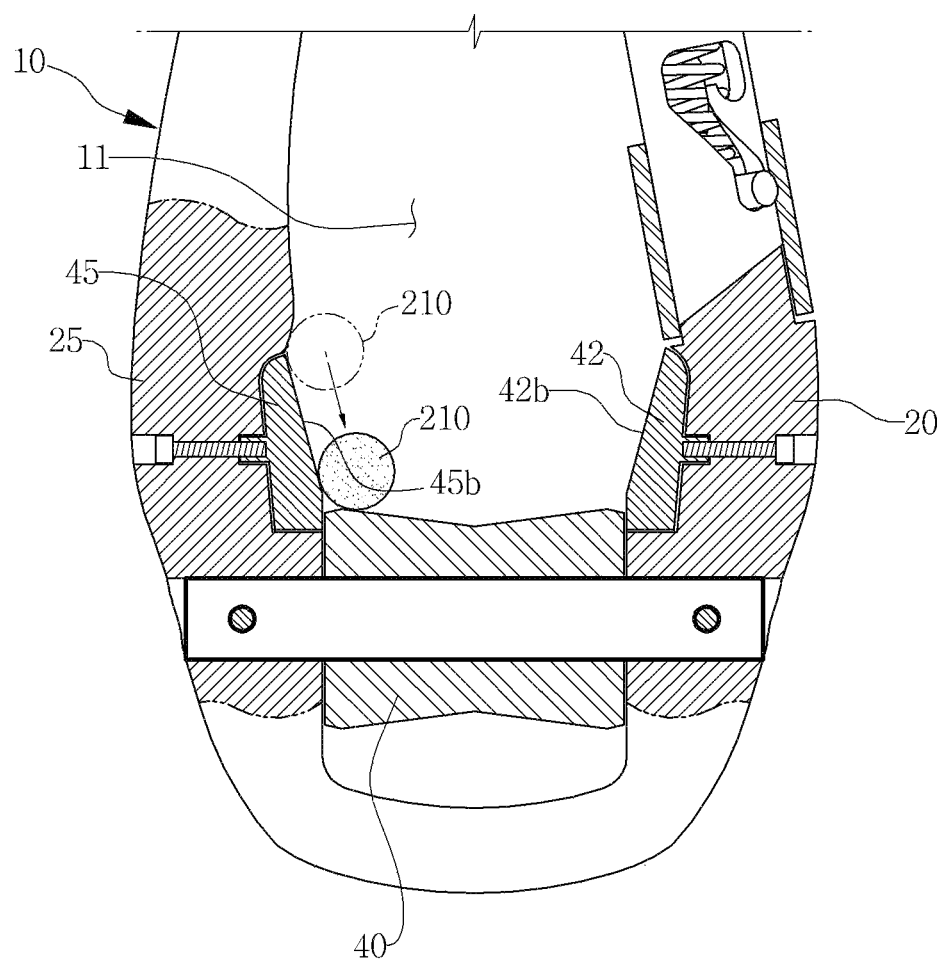
FIG. 7 is a view illustrating a process in which the load of the purse line applied to the snap ring according to the present invention is distributed to a main roller and the support.

FIG. 7 is a view illustrating a process in which the load of the purse line 210 applied to the snap ring according to the present invention is distributed into the main roller 40 to the support 42 or 45.

Referring to FIG. 7, when the purse seine used for fishing operation is hauled in, a relatively large frictional force is generated on the contact surface between the purse line 210 and the snap ring. The purse line 210 connected to the ship is sensitive to pitching and rolling of the ship. Thus, the purse line 210 may be disposed on the main roller 40 of the snap ring or, alternatively, on the first support 42 or the second support 45 of the snap ring. If the purse line 210 is disposed on the main roller 40 of the snap ring, problems are prevented because the main roller 40 rotates and offsets the frictional force of the purse line 210 and thus is able to reliably support the purse line 210.

However, if the purse line 210 is disposed on the first or second support 42 or 45, the pressure applied from the purse line 210 to the snap ring is focused on the first or second support 42 or 45. Hence, because of high pressure applied to the first or second support 42 or 45, the lifetime of the first or second support 42 or 45 and the snap ring may be reduced.

To avoid this problem, in the present invention, the first inclined surface 42b and the second inclined surface 45b are respectively formed on the outer surfaces of the first and second supports 42 and 45 that face each other. When the purse line 210 is disposed on the first or second support 42 or 45, the purse line 210 slides along the first or second inclined surface 42b or 45b which is diagonally formed towards the main roller 40. Thus, the pressure of the purse line 210 that is applied to the first or second support 42 or 45 is distributed to the first support 42 and the main roller 40 or to the second support 45 and the main roller 40. Accordingly, the lifetime of the first and second supports 42 and 45 and the snap ring can be ensured, and the replacement costs for the parts of the snap ring can be reduced.

Figure 8:
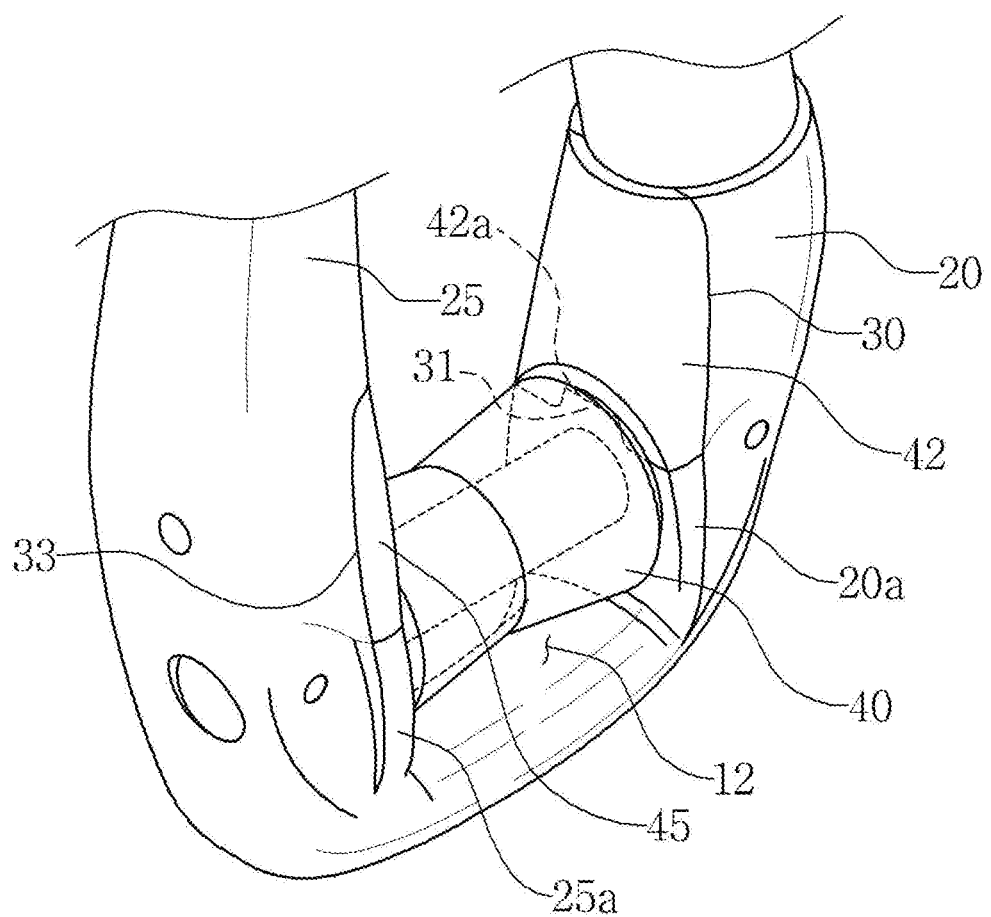
FIG. 8 is a view showing the support installed in the snap ring in such a way that the support is stopped by the main roller according to the preferred embodiment of the present invention.

FIG. 8 is a view showing the installation of the supports in such a way that they are stopped by the main roller in the snap ring according to the preferred embodiment of the present invention.

Referring to FIG. 8, the first and second reinforcing protrusions (31 and 34; refer to FIG. 6) are provided in the lower ends of the first and second receiving recesses 30 and 33 in such a way that the upper ends of the first and second reinforcing protrusions 31 and 34 are disposed inside the circumference of the main roller 40. Furthermore, the lower ends of the first and second supports 42 and 45 are also disposed inside the circumference of the main roller 40. As such, because the lower ends of the first and second supports 42 and 45 are inside the circle defined by the main roller 40, the first or second support 42 or 45 can be reliably prevented from being undesirably removed from the snap ring, even if a relatively high pressure is applied from the purse line (210; refer to FIG. 7) to the first or second support 42 or 45.

Meanwhile, protruding outside the main roller 40, first and second protrusions 20a and 25a are provided on opposite sides of the first and second side parts 20 and 25 that face the main roller 40. This structure will be explained below with reference to FIG. 9.

Figure 9:
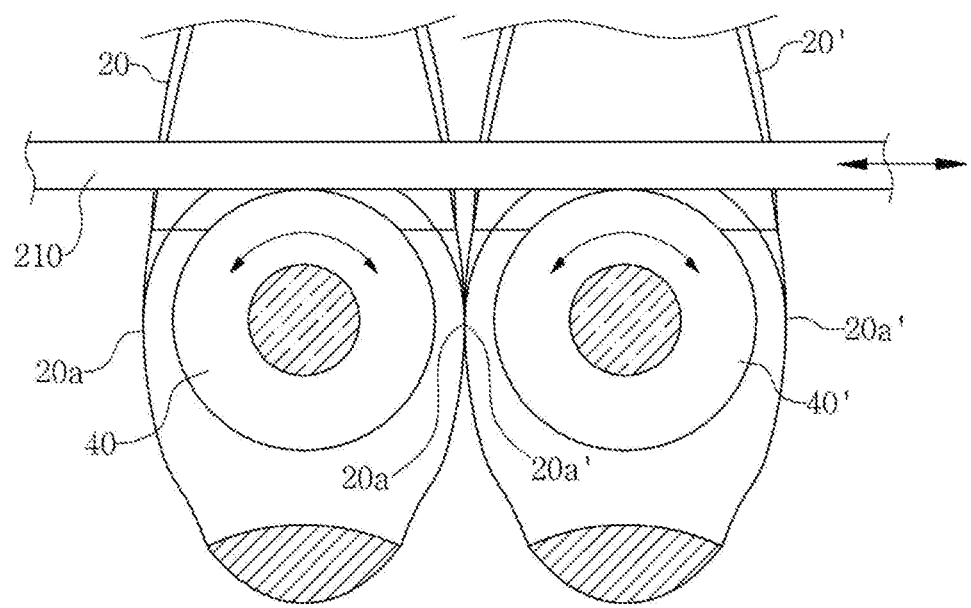
FIG. 9 is a view illustrating protrusions of the snap ring according to the preferred embodiment of the present invention.

FIG. 9 is a view illustrating the protrusions of the snap ring according to the preferred embodiment of the present invention.

Referring to FIG. 9, in the conventional technique, when the purse seine is hauled in during fishing operation, the frames of the snap rings are brought into contact with each other and are gradually worn. Ultimately, the circumference of the main roller becomes disposed outside the frame. Then, the main roller of the snap ring makes contact with the main roller of another adjacent snap ring so that the main rollers cannot smoothly rotate. As a result, the purse line that moves on the main rollers creates friction with the main rollers and thus creates wear. Grooves are formed in the main rollers by friction with the purse line.

To solve this problem, in the present invention, the first protrusion 20a, 20a' and the second protrusion (25a; refer to FIG. 8) protrude outwards in a radial direction of the main roller 40, 40' from the opposite sides of the first side part 20, 20' and the second side part (25; refer to FIG. 7) that face the main roller 40, 40'. Then, when the frames (10; refer to FIG. 7) of the snap rings make contact with each other, the adjacent main rollers 40 and 40' are spaced apart from each other by virtue of a distance between the circumferential outer surface of each main roller 40, 40' and the edges of the first and second protrusions 20, 20a' and 25a. Thereby, disposed adjacent to each other, the main rollers 40 and 40' can smoothly rotate.

Figure 10:
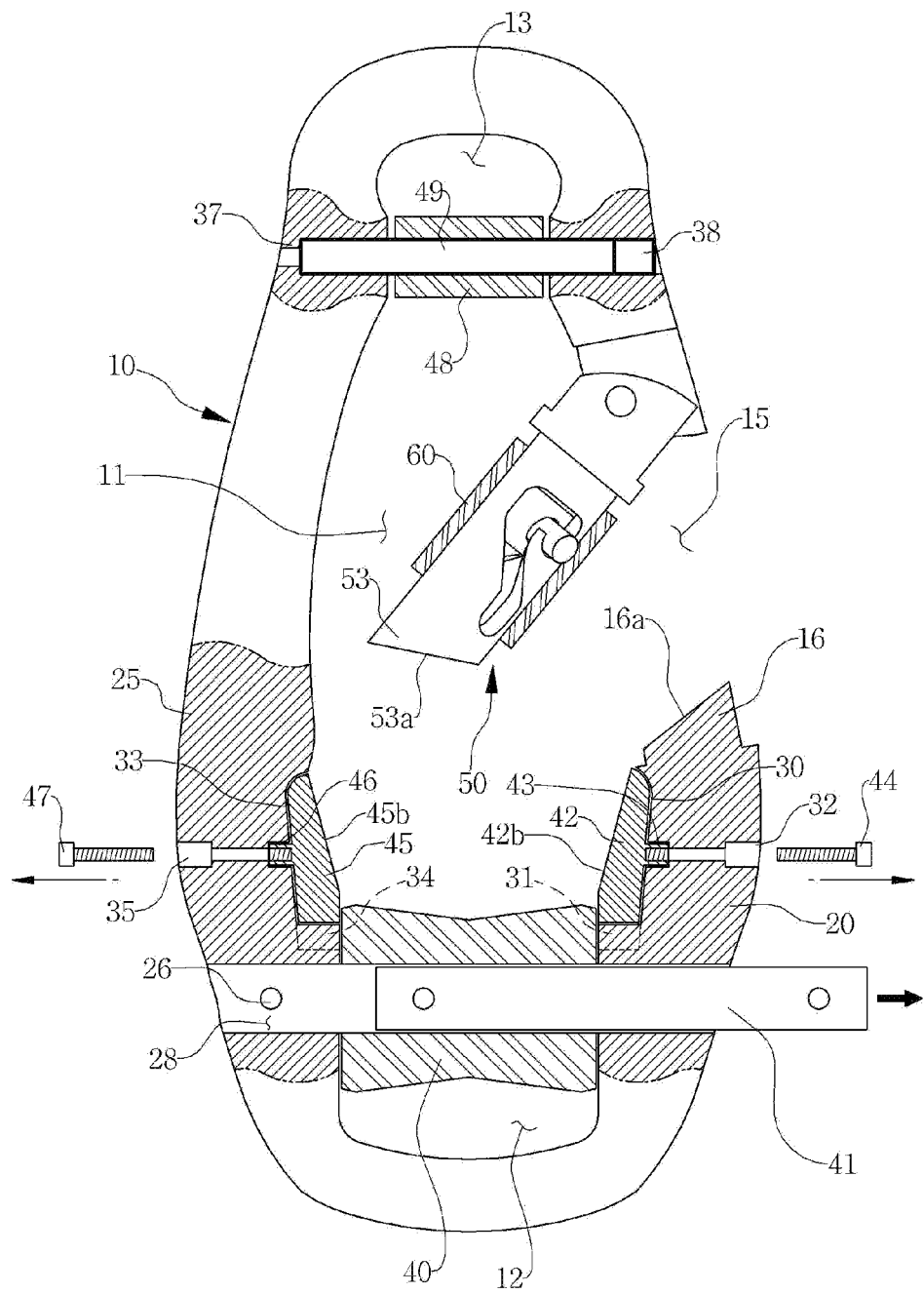
FIG. 10 is a view illustrating a process of disassembling the snap ring according to the preferred embodiment of the present invention.

FIG. 10 is a view illustrating a process of disassembling the snap ring according to the preferred embodiment of the present invention.

Referring to FIG. 10, the snap ring according to the preferred embodiment of the present invention has a simple structure so that the assembly and disassembly thereof can be facilitated. Hereinafter, the process of disassembling the snap ring will be explained.

First, the first and second fastening pins 23 and 27 that has been for use in fastening the main shaft 41 to the frame 10 are removed from the frame 10. Thereafter, the main shaft 41 is moved outwards from the first and second shaft coupling holes 24 and 28 of the frame 10 and then, along with the main roller 40, removed from the frame 10. Subsequently, the first and second fasteners 44 and 47 are removed from the first and second through holes 32 and 35 of the frame 10, and the first and second supports 42 and 45 are removed from the first and second receiving recesses 30 and 33 of the frame 10.

As such, the snap ring according to the preferred embodiment of the present invention is configured such that the main roller 40 and the first and second supports 42 and 45 can be easily removed from the frame 10 merely by removing the first and second fastening pins 23 and 27 and the first and second fasteners 44 and 47 from the frame 10. Therefore, the assembly and disassembly of the snap ring can be facilitated. The simple assembly process can reduce the manufacturing cost. Even if parts of the snap ring malfunction or become worn, replacing just the malfunctioning or worn parts with new ones can be easily performed.

Figure 11A:
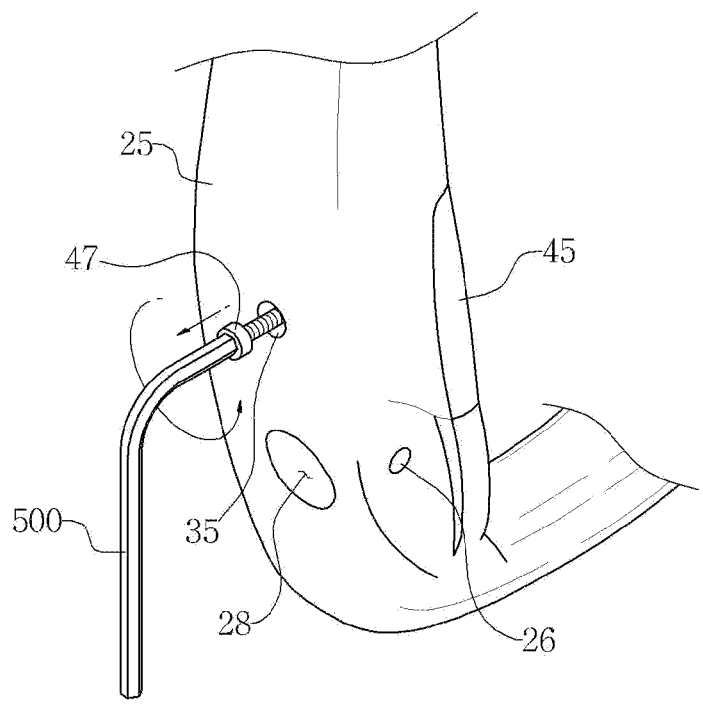
Figure 11A:
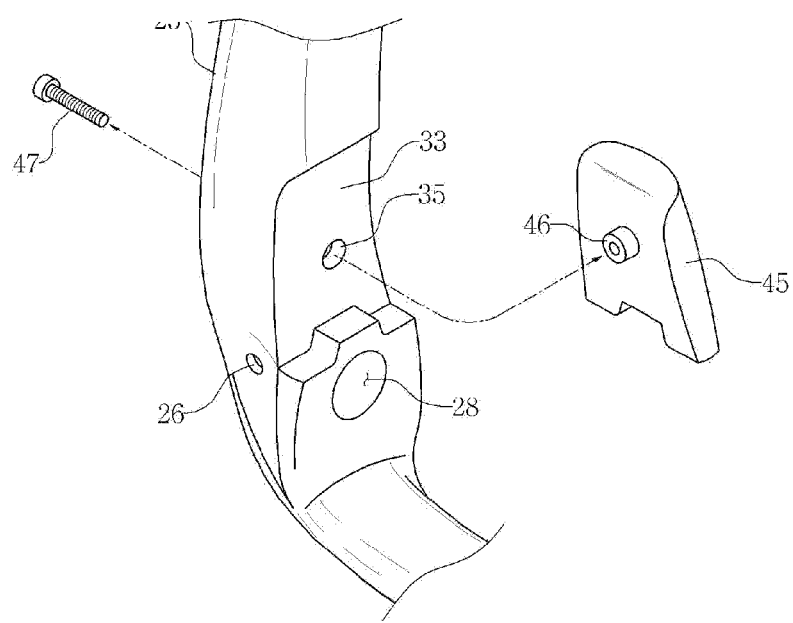

FIGS. 11A and 11B are views illustrating a process of removing the support from the snap ring according to the preferred embodiment of the present invention.

Referring to FIGS. 11A and 11B, when the second support 45 is worn and required to be replaced with a new one, the second fastener 47 is rotated and loosened by a tool such as a hexagonal wrench, as shown in FIG. 11A. Then, the second fastener 47 is successively removed from the second insert part 46 of the second support 45 and the second through hole 35 of the frame 10. After the second fastener 47 has been removed from the frame 10, as shown in FIG. 11B, the second support 45 can be easily removed from the second receiving recess 33 of the frame 10. Thereafter, the second support 45 is replaced with a new one. The first support (42; refer to FIG. 10) can also be replaced with a new one in the same manner as that of the second support 45, and detailed explanation thereof will be omitted.

Figure 12:
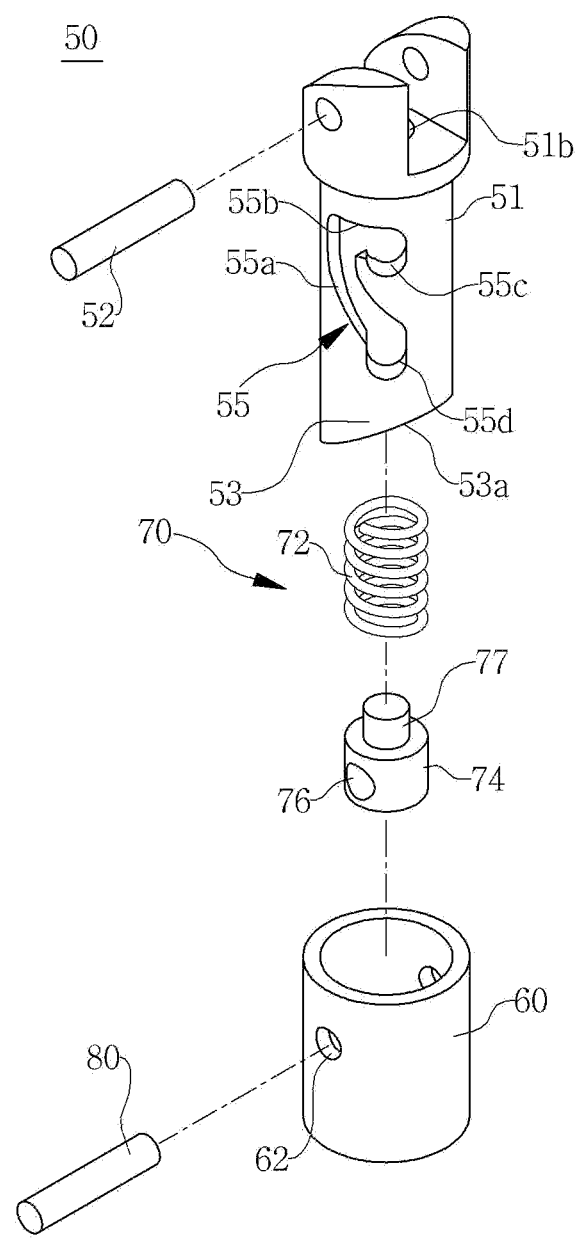
FIG. 12 is an exploded perspective view of a locking unit of the snap ring according to the preferred embodiment of the present invention.
Figure 13:
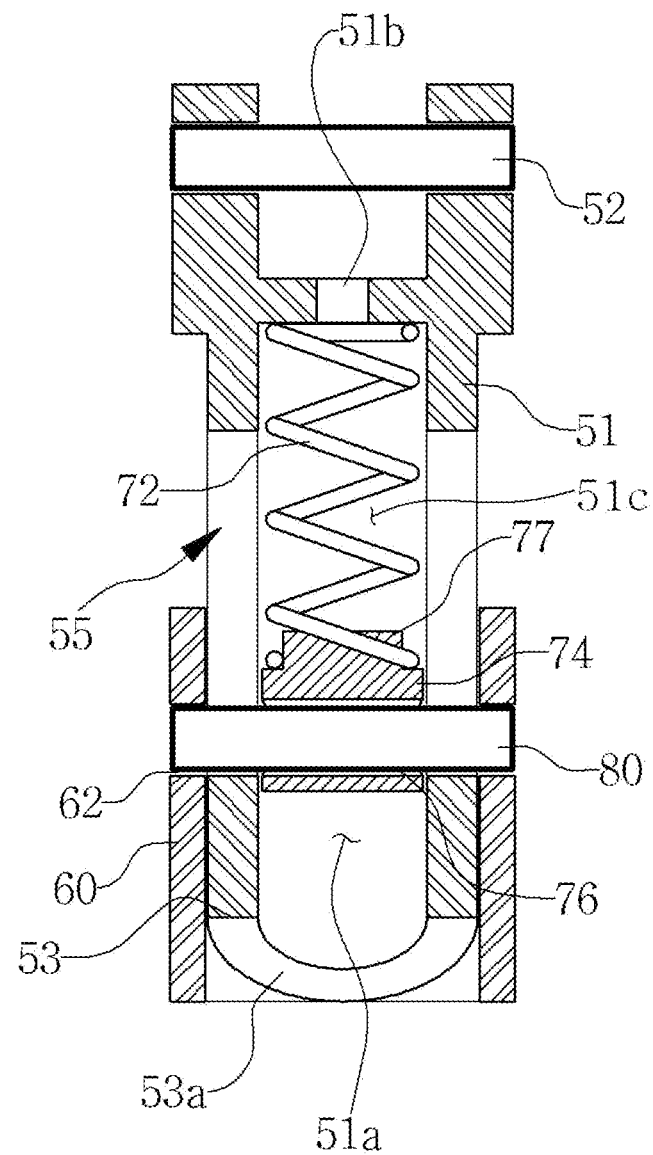
FIG. 13 is a sectional view of the locking unit of the snap ring according to the preferred embodiment of the present invention.

FIG. 12 is an exploded perspective view of a locking unit of the snap ring according to the preferred embodiment of the present invention. FIG. 13 is a sectional view of the locking unit of the snap ring according to the preferred embodiment of the present invention.

Referring to FIGS. 12 and 113, the locking unit 50 of the snap ring of the present invention is configured to open and close the frame opening 15 and includes a first cylinder 51, an elastic unit 70 and a second cylinder 60.

The first cylinder 51 is disposed in a first end of the frame opening 15. A first end of the first cylinder 51 is rotatably coupled by a hinge shaft 52 to a portion of the frame 10, which corresponds to the first end of the frame opening 15. A locking part 53 protrudes from a second end of the first cylinder 51 and is coupled to a coupling guide (16; refer to FIG. 10) provided on a second end of the frame opening 15 of the frame 10. To prevent the end of the first cylinder 51 from making contact with the second side part 25 when the first cylinder 51 that is hinged to the frame 10 rotates inwards in the frame 10, the first cylinder 51 is hinged to the frame 10 deliberately misaligned at a predetermined angle with respect to the second side part 25.

The locking part 53 protrudes from the second end of the first cylinder 51 towards the second end of the frame opening 15. A front end of the locking part 53 extends in both directions. The coupling guide 16 is provided on the frame 10 at a position that corresponds to the second end of the frame opening 15 when the first cylinder 51 is rotated and disposed in the frame opening 15.

The ends of the coupling guide 16 and the locking part 53 that face each other respectively have a first inclined surface 16a and a second inclined surface 53a. The second inclined surface 53a is oriented facing the inside of the frame 10 so that when the first inclined surface 16a makes contact with the second inclined surface 53a as the first cylinder 51 rotates, the first cylinder 51 can be prevented from being moved out of the frame 10. As such, the first inclined surface 16a and the second inclined surface 53a can prevent the first cylinder 51 from moving out of the frame 10, whereby the angle by which the first cylinder 51 can be rotated is limited. Furthermore, the locking unit 50 is configured such that the second cylinder 60 which will be described in more detail later herein slides along the first cylinder 51 to receive the coupling guide 16 and the locking part 53 therein or release them, thus preventing or allowing opening of the frame opening 15 of the frame 10.

A guide slot 55 is longitudinally formed in a side surface of the first cylinder 51. A guide pin 80 is placed in the guide slot 55 in a direction perpendicular to the longitudinal direction of the guide slot 55 so as to be movable along the guide slot 55. The guide slot 55 includes a first guide slot 55a which extends a predetermined length in the longitudinal direction of the first cylinder 51, and a second guide slot 55b which extends a predetermined length from a first end of the first guide slot 55a that corresponds to the first end of the frame opening 15 in a direction in which the second cylinder 60 which will be explained later herein rotates on its own axis. The first guide slot 55a may be oriented in a direction parallel to the longitudinal direction of the first cylinder 51. Alternatively, the first guide slot 55a may be slanted with respect to the longitudinal direction of the first cylinder 51. An end of the second guide slot 55b and a second end of the first guide slot 55a may be disposed on the same line parallel to the longitudinal direction of the first cylinder 51. A stop portion 55c which is concave towards the second end of the first cylinder 51 is formed in the end of the second guide slot 55b so that when the guide pin 80 is disposed in the end of the second guide slot 55b, the guide pin 80 is locked to the stop portion 55c by the elastic force of the elastic unit 72 which will be explained later herein. A fixing portion 55d is formed in the second end of the first guide slot 55a in a shape in which it encircles around the circumference of the guide pin 80. When the guide pin 80 which moves along the guide slot 55 is disposed in the fixing portion 55d, it can be maintained in place without moving to the left or right.

The first cylinder 51 has therein a receiving space 51c in which the elastic unit 70 which will be explained later herein is disposed. The receiving space 51c is a hollow space which is formed along the first cylinder 51 so that the elastic unit 70 is disposed in the first cylinder 51. An insert hole 51a is formed in the second end of the first cylinder 51 so that the elastic unit 70 can be inserted into the first cylinder 51 through the insert hole 51a. A drain hole 51b is formed in the first end of the first cylinder 51 so that water or the like which is drawn into the receiving space 51c through the guide slot 55 of the first cylinder 51 can be easily drained out of the first cylinder 51.

The elastic unit 70 is inserted into the receiving space 51c through the insert hole 51a of the first cylinder 51. The elastic unit 70 includes an elastic part 72 and a movable part 74 which are successively inserted into the receiving space 51c. The elastic part 72 is a compression spring, a coil spring or the like which has appropriate elasticity. A first end of the elastic part 72 makes close contact with the movable part 74, and a second end thereof makes close contact with the first end of the first cylinder 51. A receiving hole 76 into which the guide pin 80 is inserted is formed in the movable part 74. The movable part 74 is disposed in the receiving space 51c of the first cylinder 51 so as to be movable in the receiving space 51c along the longitudinal direction. The cross-section of the movable part 74 is circular, and the receiving space 51c also has a circular cross-section so that the movable part 74 can smoothly rotate on its own axis in the receiving space 51c. A spring connection protrusion 77 protrudes from the movable part 74 at a position facing the elastic part 72, and the elastic part 72 is fitted over the spring connection protrusion 77.

The second cylinder 60 has a hollow cylindrical shape such that the first cylinder 51 is inserted into the second cylinder 60. When the first cylinder 51 rotates on the hinge and closes the frame opening 15, a first end of the second cylinder 60 slides along the first cylinder 51 towards the second end of the first cylinder 51. As a result, the second cylinder 60 receives therein the locking part 53 and the coupling guide 16 which are positioned at the second end of the first cylinder 51, thus preventing the locking part 53 that has been locked to the coupling guide 16 from being undesirably released from the coupling guide 16. Therefore, even if a large load is applied to the frame 10 by the weight of the purse seine and the purse line 210, because the locking part 53 and the coupling guide 16 are disposed in the second cylinder 60 and are reliably locked to each other, the frame opening 15 can be reliably maintained in the state of being closed by the locking unit 50.

In order to embody the structure such that when the guide pin 80 moves along the guide slot 55 of the first cylinder 51 the second cylinder 60 can be towed and moved by the guide pin 80, a guide hole 62 is formed in the second cylinder 60, and the guide pin 80 is inserted into the second cylinder 60 through the guide hole 62.

The guide hole 62 is formed in the outer surface of the second cylinder 60 at a position corresponding to the guide pin 80 that is disposed at the stop portion 55c of the second guide slot 55b when the second cylinder 60 has moved to the first end of the first cylinder 51. The guide pin 80 is disposed in the outer surface of the second cylinder 60 through the guide hole 62.

Furthermore, when the guide pin 80 moves from the stop portion 55c of the second guide slot 55b to the end of the first guide slot 55a or from the end of the first guide slot 55a to the stop portion 55c of the second guide slot 55b, the second cylinder 60 is towed by the guide pin 80 and moved along the longitudinal direction of the first cylinder 51. Here, the second cylinder 60 rotates on its own axis and moves along the first guide slot 55a that is slanted with respect to the longitudinal direction of the first cylinder 51, thus opening or closing the frame opening 15. This will be explained in more detail with reference to FIGS. 14 and 15.

Figure 14:
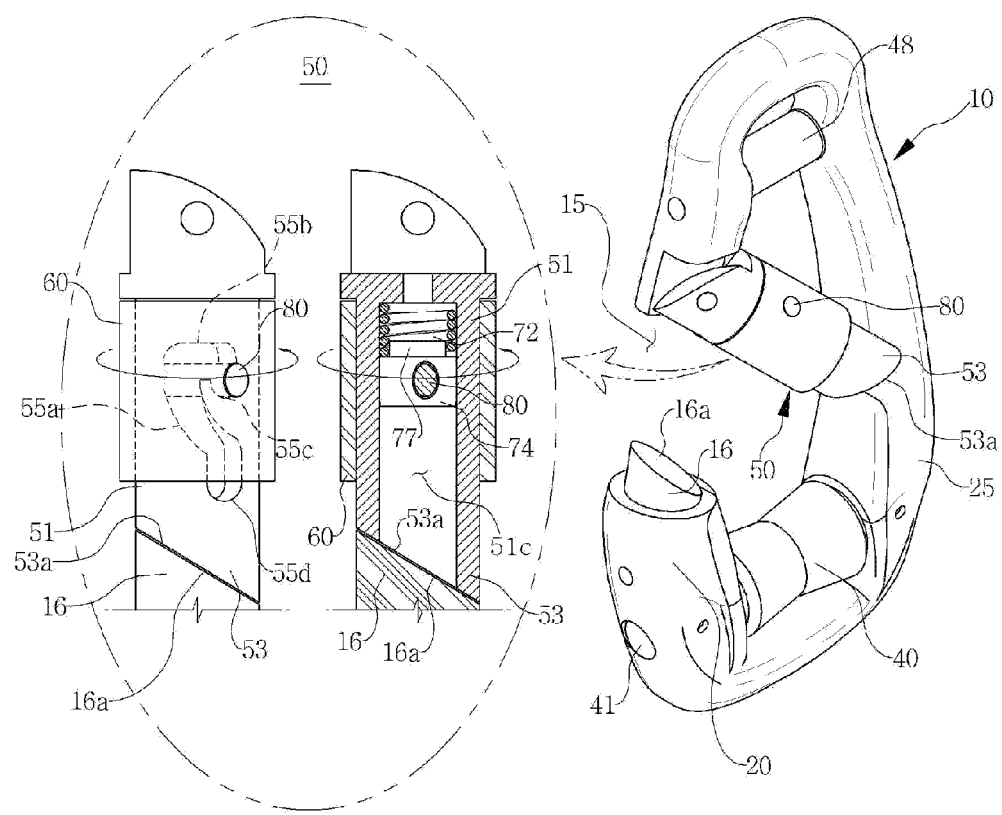
FIGS. 14 and 15 are views illustrating the open state and the closed state of the locking unit of the snap ring according to the preferred embodiment of the present invention
Figure 15:
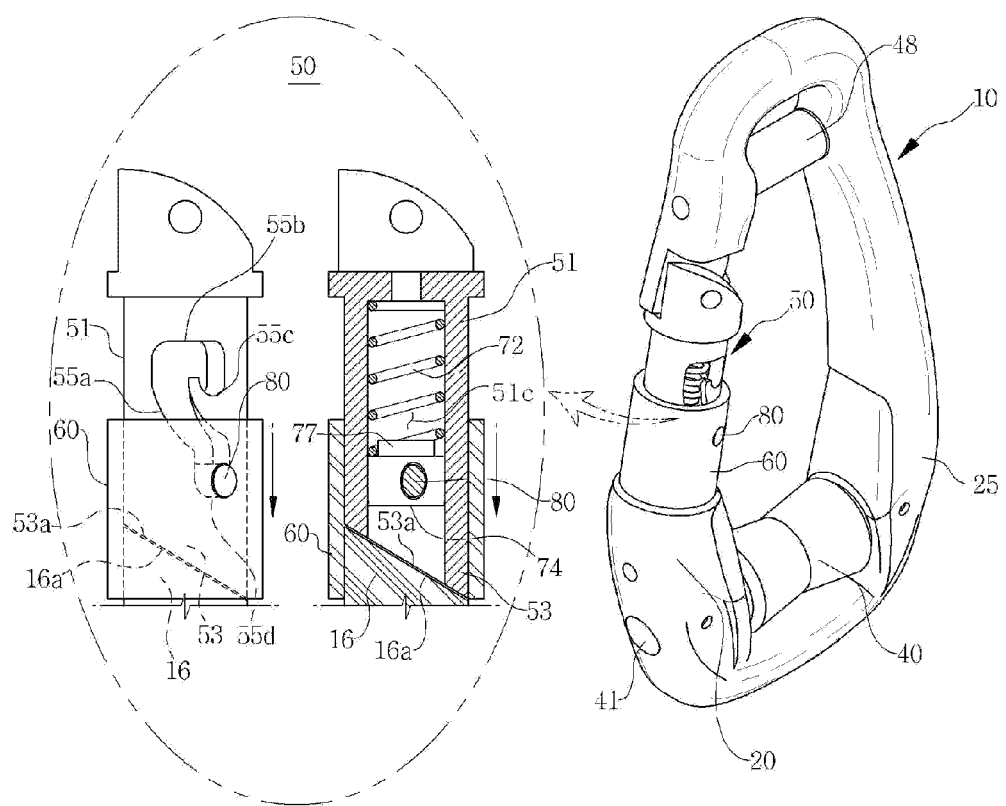

FIGS. 14 and 15 are respectively a perspective view and a partial section view illustrating the open state and the closed state of the locking unit of the snap ring according to the preferred embodiment of the present invention.

FIG. 14 illustrates the open state of the frame opening 15 of the frame 10. For the open state of the frame opening 15, the second cylinder 60 that has been disposed in the second end of the first cylinder 51 is moved towards the first end of the first cylinder 51 such that the guide pin 80 that has been in the end of the first guide slot 55a enters the stop portion 55c of the second guide slot 55b. Here, the guide pin 80 is pushed towards the stop portion 55c by the elastic force of the elastic part 72. Thereby, the guide pin 80 is not removed from the stop portion 55c unless a comparatively large external force is applied thereto.

As such, when the guide pin 80 is disposed in the stop portion 55c of the second guide slot 55b, the second cylinder 60 is positioned adjacent to the first end of the first cylinder 51, whereby the first end of the second cylinder 60 releases both the coupling guide 16 of the frame 10 and the locking part 53 of the first cylinder 51. Consequently, the frame opening 15 of the frame 10 is opened.

Meanwhile, when the guide pin 80 enters the stop portion 55c of the second guide slot 55b from the first guide slot 55a, the second cylinder 60 that is coupled to the guide pin 80 rotates on its own axis along with the guide pin 80 and, simultaneously, the movable part 74 that is coupled to the guide pin 80 also rotates on its own axis along the guide pin 80. Because the elastic part 72 merely makes contact with the movable part 74 rather than being fixed to the movable part 74, the elastic part 72 is not twisted by the rotation of the movable part 74. In other words, the movable part 74 slides with respect to the end of the elastic part 72 while rotating on its own axis. As such, since the elastic part 72 is not twisted even when the movable part 74 rotates on its own axis, the durability of the elastic part 72 is increased, whereby the replacement cost of the parts can be reduced. Furthermore, because a separate coupling means for coupling the movable part 74 to the elastic part 72 is not required, the production cost can be reduced.

FIG. 15 illustrates the closed state of the frame opening 15 of the frame 10. For this, the second cylinder 60 is reversely rotated on its own axis. Then, the guide pin 80 that has been in the stop portion 55c of the second guide slot 55b is removed from the stop portion 55c and moved towards the first end of the first guide slot 55a. Thereafter, the guide pin 80 is automatically moved towards the second end of the first guide slot 55a by the elastic force of the elastic part 72 and then inserted into the fixing portion 55d. By virtue of the elastic force of the elastic part 72, the guide pin 80 can be prevented from being undesirably removed from the fixing portion 55d, unless a comparatively large external force is applied thereto. Further, when the guide pin 80 enters the fixing portion 55d, the second cylinder 60 is moved towards the second end of the guide slot 55 by the guide pin 80, and the end of the second cylinder 60 receives both the coupling guide 16 of the frame 10 and the locking part 53 of the first cylinder 51. Eventually, the frame opening 15 of the frame 10 is closed. In the same manner, because the elastic part 72 is not fixed to the movable part 74, when the movable part 74 rotates on its own axis or reversely rotates, the movable part 74 slides on the end of the elastic part 72. Therefore, the elastic part 72 can be prevented from being twisted by the movable part 74.

As such, the present invention is configured such that the elastic part 72 is prevented from being twisted when the second cylinder 60 moves along the first cylinder 51, whereby the durability of the elastic part 72 is increased, thus reducing the replacement cost of the parts.

Although the embodiment of the snap ring for connecting the purse line 210 to the purse seine for fishing has been illustrated, the present invention is not limited to this embodiment. For instance, the snap ring of the present invention may be used in other fields, in which a thick rope or cable to which a heavy load is applied is used, in such a way that the rope or cable is disposed in the first space 11 of the frame 10 so that frictional force between the frame 10 and the rope or the frame 10 and the cable can be reduced.

Figure 16:
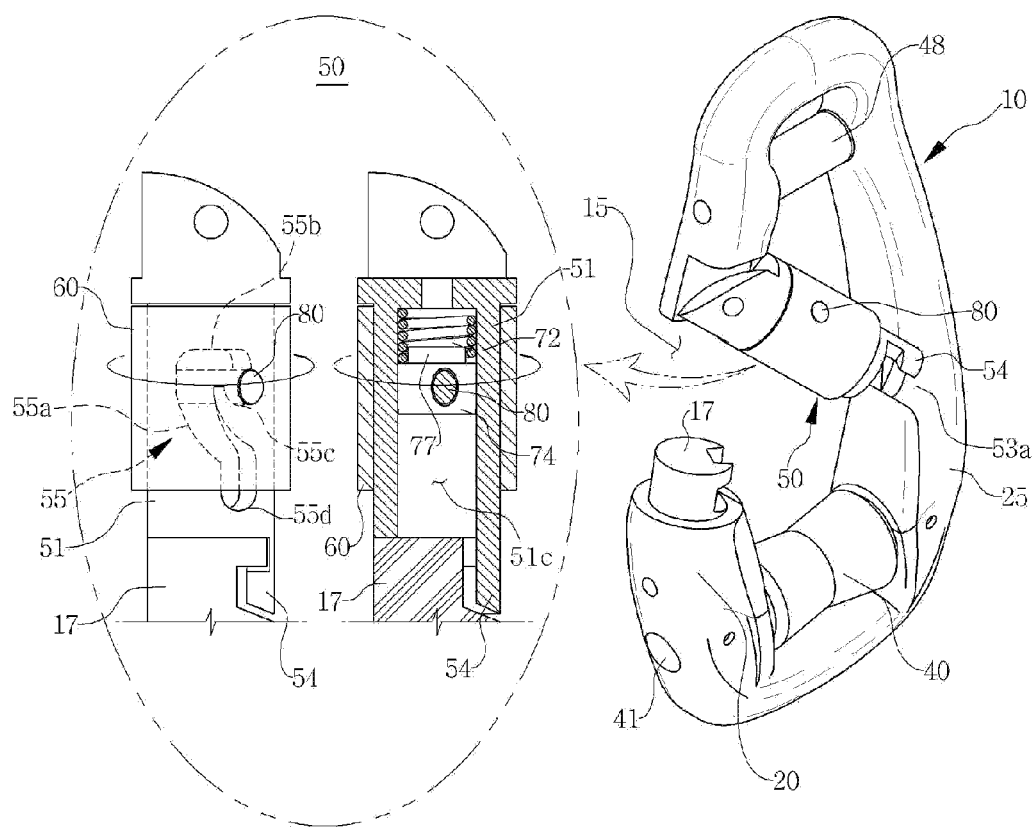
FIG. 16 illustrates a modification of a coupling guide and a locking part of the snap ring according to the preferred embodiment of the present invention.

FIG. 16 illustrates a modification of the coupling guide and the locking part of the snap ring according to the preferred embodiment of the present invention.

Referring to FIG. 16, the coupling guide 17 and the locking part 54 are removably coupled to each other in such a way that they engage with each other. In detail, the coupling guide 17 is formed in the frame 10, and the locking part 54 protrudes from the second end of the first cylinder 51 towards the coupling guide 17. A front end of the locking part extends in both directions. The coupling guide 17 and the locking part 54 are disposed and configured such that the locking part 54 can be inserted into and engaged with the coupling guide 17. Thus, the locking part 54 can be reliably locked and coupled to the coupling guide 17.

Figure 17A:
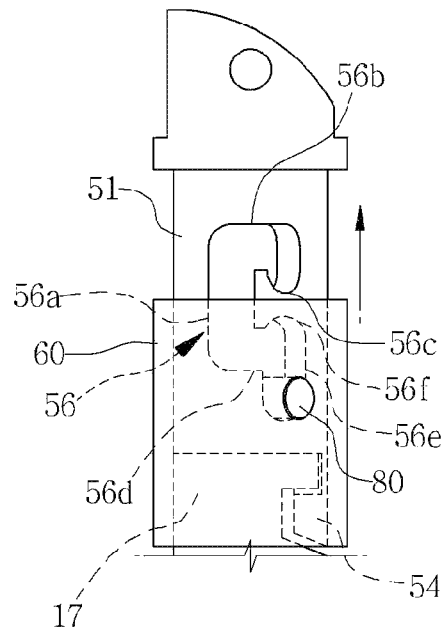
FIGS. 17A and 17B are views illustrating a modification of a guide rail of the snap ring according to the preferred embodiment of the present invention.
Figure 17B:
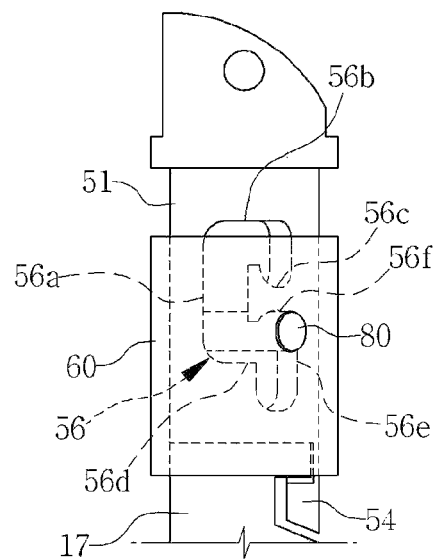

FIGS. 17A and 17B are views illustrating a modification of the guide rail of the snap ring according to the preferred embodiment of the present invention.

Referring to FIGS. 17A and 17B, the guide rail 56 is formed in a side surface of the first cylinder 51 so as to guide the guide pin 80. The guide slot 55 includes a first guide slot 56a which extends a predetermined length in the longitudinal direction of the first cylinder 51, and a second guide slot 56b which extends a predetermined length from a first end of the first guide slot 56a that corresponds to the first end of the frame opening 15 in a direction in which the second cylinder 60 rotates on its own axis. The guide slot 55 further includes a connection slot 56d which extends from the second end of the first guide slot 56a in the direction in which the second cylinder 60 rotates on its own axis, and a third guide slot 56e which extends from an end of the connection slot 56d towards the second end of the frame opening 15.

When the guide pin 80 moves from the third guide slot 56e to the end of the second guide slot 56b via the connection slot 56d and the first guide slot 56a or from the end of the second guide slot 56b to the third guide slot 56e via the first guide slot 56a and the connection slot 56d, the second cylinder 60 is towed by the guide pin 80 and moved along the longitudinal direction of the first cylinder 51 such that the coupling guide 17 and the locking part 54 are inserted into the second cylinder 60 or removed therefrom, whereby the frame opening 15 of the frame 10 is opened or closed. Here, the guide pin 80 is moved along the guide slot 56 by the movement of the second cylinder 60. When the guide pin 80 is moved from the first guide slot 56a to the second guide slot 56b or from the first guide slot 56a or the third guide slot 56e to the connection slot 56d, it is preferable that the user forcibly rotate the second cylinder 60 on its own axis so that the guide pin 80 can be easily moved.

A first stop portion 56c which is concave towards the second end of the first cylinder 51 is formed in the end of the second guide slot 56b so that when the guide pin 80 is disposed in the end of the second guide slot 56b after having passed through the second guide slot 56b, the guide pin 80 is locked to the stop portion 56c by the elastic force of the elastic unit 72.

When the guide pin 80 is disposed in the third guide slot 56e, the second cylinder 60 is disposed at a position to receive both the coupling guide 17 and the locking part 54 therein. Here, the guide pin 80 is compressed by the elastic force of the elastic unit 72 towards the end of the third guide slot 56e. Therefore, the second cylinder 60 is limited in moving. However, if external pressure which is greater than the elastic force of the elastic unit 72 is applied to the second cylinder 60 by foreign substances or the like floating in the sea, the second cylinder 60 may move towards the first end of the first cylinder 51, and the coupling guide 17 and the locking part 54 may be released from the second cylinder 60. To overcome this problem, in the present invention, a second stop portion 56*f* which is concave towards the first end of the frame opening 15 is formed in the end of the connection slot 56*d*. Thus, even when the second cylinder 60 is undesirably moved towards the first end of the first cylinder 51, because the guide pin 80 which is moved along the third guide slot 56*e* by the movement of the second cylinder 60 is locked to the second portion 56*f*, the movement of the second cylinder 60 is stopped. At this time, the lower end of the second cylinder 60 still covers both the coupling guide 17 and the locking part 54 so that the second cylinder 60 can reliably maintain the closed state of the frame opening 15 of the frame 10.

Furthermore, the guide pin 80 that is disposed in the first stop portion 56*c* or the second stop portion 56*f* is limited in moving away therefrom unless external pressure is applied thereto. That is, only when the user deliberately rotates the second cylinder 60 on its own axis can the second cylinder 60 be moved to the first guide slot 56*a* or the connection slot 56*d*.

As described above, in a snap ring having an easily replaceable support according to the present invention, in lieu of a side roller having a complex structure, a support having a simple structure is provided in each of the first and second side parts of a frame such that the support and a main roller can reliably support a purse line and overcome friction between the snap ring and the purse line. Furthermore, each of the support and the main roller is configured so as to be separately replaceable with a new one. Thus, even if the support or main roller becomes worn, it can be easily replaced with a new one.

In addition, a surface of each support is inclined downwardly towards the corresponding end of the main roller. When the purse line is placed on the support, the purse line easily slides along the support to the main roller. Thereby, the pressure applied from the purse line to the snap ring or the main roller can be distributed to the support and the main roller rather than being focused on either side. Accordingly, the lifetime of the snap ring can be increased, and the costs required for replacement of the snap ring can be reduced.

Furthermore, in the present invention, even if the frames of several snap rings come into contact with each other, the main rollers of the snap rings can rotate without impeding each other by virtue of a protrusion which is provided on the frame and spaces the circumferential surface of the main roller apart from the outer surface of the frame.

Moreover, the main roller and the supports are disposed adjacent to each other. Thus, the purse line that is placed on either of the supports can be easily directly moved to the main roller. The purse line that is placed on the main roller can be easily directly moved to either of the supports.

In the present invention, the lower ends of the supports are disposed inside the main roller. Even when a relatively high pressure is applied from the purse line to either of the supports, the support can be prevented from being undesirably removed from its original position.

Furthermore, the snap ring according to the present invention is configured such that an elastic part is not fixed to a movable part. Therefore, even when the movable part is rotated with along with a guide pin, the elastic part is not twisted, whereby the durability of the elastic part can be increased Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A snap ring, comprising:
    a frame including: a first side part; a second side part disposed facing the first side part and connected to the first side part; and a space defined between the first side part and the second side part so that a purse line is placed in the space;
    a main roller provided spanning a first end of the first side part and a first end of the second side part, the main roller being disposed such that the purse line comes into contact with a circumferential outer surface of the main roller;
    a frame opening formed in either the first side part or the second side part;
    a locking unit openably closing the frame opening; and
    a support statically attached to at least one of inner surfaces of the first and second side parts that face each other, the support being disposed at an end thereof adjacent to a corresponding end of the main roller,
    wherein the support is configured such that a portion of the purse line that comes into contact with the main roller makes contact with the support or a portion of the purse line that comes into contact with the support makes contact with the main roller;
    wherein an outer surface of the support that makes contact with the purse line is inclined towards the corresponding end of the main roller.

2. The snap ring as set forth in claim 1, wherein the support is removably coupled to the first side part or the second side part.

3. The snap ring as set forth in claim 1, wherein a receiving recess is formed in the inner surface of at least one of the first and second side parts so that the support is disposed in the receiving recess.

4. The snap ring as set forth in claim 3, wherein shaft coupling holes are respectively formed in the first and second side parts so that a main shaft functioning as a rotating axis of the main roller is disposed in the shaft coupling holes, and
    a reinforcing protrusion is provided in a first end of the receiving recess that is disposed adjacent to a side of the corresponding shaft coupling hole, the reinforcing protrusion protruding into the receiving recess towards a second end of the receiving recess such that a distance between the shaft coupling hole and the receiving recess is increased, whereby force with which the first and second side parts support the main shaft that has been disposed in the shaft coupling holes is reinforced.

5. The snap ring as set forth in claim 4, wherein an insert depression is formed in the end of the support so that the reinforcing protrusion is disposed in the insert depression,
    wherein the insert depression is disposed inside a circumference of the main roller so that the end of the support is disposed inside the circumference of the main roller.

6. The snap ring as set forth in claim 1, wherein a main shaft functioning as a rotating axis of the main roller is removably inserted into the first and second side parts.

7. The snap ring as set forth in claim 1, wherein a protrusion protrudes outwards from at least one of the first and second side parts in a radial direction of the main roller,
    whereby when the frame comes into contact with a frame of another adjacent snap ring, by virtue of a distance between the outer circumferential surface of the main roller and an outer surface of the protrusion, rotation of the main roller is prevented from being affected by the adjacent snap ring.

8. The snap ring as set forth in claim 1, further comprising an auxiliary roller provided spanning a second end of the first side part and a second end of the second side part.

9. The snap ring as set forth in claim 1, wherein the locking unit comprises:
a first cylinder having a first end rotatably coupled to a portion of the frame that corresponds to a first end of the frame opening, and a second end facing a locking part that corresponds to a second end of the frame opening; and
a second cylinder movably fitted over the first cylinder, the second cylinder sliding along the first cylinder and opening or closing the frame opening.

10. The snap ring as set forth in claim 9, wherein
a coupling guide is provided on the second end of the first cylinder,
the locking part is provided on the frame at a position facing the second end of the frame opening such that the locking part faces the coupling guide,
when the first cylinder is rotated in a normal direction and the second end of the first cylinder is disposed in the second end of the frame opening, the second cylinder is permitted to slide towards the second end of the frame opening and receive the coupling guide and the locking part, and
when the second cylinder slides towards the first end of the frame opening and releases the coupling guide and the locking part, the first cylinder is permitted to rotate in a reverse direction such that the second end of the first cylinder moves away from the second end of the frame opening.

11. The snap ring as set forth in claim 10, wherein an end of the coupling guide and an end of the locking part that faces the end of the coupling guide respectively have a first inclined surface and a second inclined surface, and
the second inclined surface is oriented facing an inside of the frame so that the first cylinder is prevented from moving out of the frame when the first cylinder rotates and the first inclined surface comes into contact with the second inclined surface.

12. The snap ring as set forth in claim 10, wherein the coupling guide and the locking part are coupled to each other in an engagement coupling fashion.

13. The snap ring as set forth in claim 9, wherein
a guide slot is formed in a side surface of the first cylinder in a longitudinal direction of the first cylinder, and a guide pin is disposed in the guide slot and coupled to the second cylinder,
wherein the guide pin moves along the guide slot to move the second cylinder.

14. The snap ring as set forth in claim 13, wherein the guide slot comprises:
a first guide slot extending a predetermined length in the longitudinal direction of the first cylinder; and
a second guide slot extending a predetermined length from a first end of the first guide slot that corresponds to the first end of the frame opening in a direction in which the second cylinder rotates on its own axis.

15. The snap ring as set forth in claim 14, wherein a receiving space is formed in the first cylinder, and an elastic unit is disposed in the receiving space,
the elastic unit comprises:
an elastic part having a first end supported by the first cylinder in a first end of the receiving space that faces the first end of the first cylinder, and a second end disposed in a second end of the receiving space; and
a movable part disposed on the second end of the elastic part, with a receiving hole formed in the movable part so that the guide pin is disposed in the receiving hole,
wherein when the guide pin moves from the second guide slot and enters the first end of the first guide slot, the guide pin is automatically moved along the first guide slot towards a second end of the first guide slot by elastic force of the elastic part, and
when the guide pin moves from the first guide slot and enters an end of the second guide slot, the guide pin is pushed to the end of the second guide slot by the elastic force of the elastic part so that the guide pin is prevented from being moved towards the first guide slot.

16. The snap ring as set forth in claim 15, wherein the first guide slot is slanted with respect to the longitudinal direction of the first cylinder.

17. The snap ring as set forth in claim 15, wherein a stop portion is formed in the end of the second guide slot, the stop portion being concave towards the second end of the first cylinder, and
when the guide pin is disposed in the end of the second guide slot, the guide pin is locked to the stop portion by the elastic force of the elastic part.

18. The snap ring as set forth in claim 15, wherein a fixing portion is formed in the second end of the first guide slot and is concave such that the fixing portion encircles a circumference of the guide pin, and
when the guide pin is disposed in the second end of the first guide slot, the guide pin is fixed in place by the fixing portion without being moved leftwards or rightwards.

19. The snap ring as set forth in claim 15, wherein the guide slot further comprises:
a connection slot extending from the second end of the first guide slot in the direction in which the second cylinder rotates on its own axis; and
a third guide slot extending from an end of the connection slot towards the second end of the frame opening.

20. The snap ring as set forth in claim 19, wherein a stop portion is formed in the end of the connection slot, the stop portion being concave in a direction opposite to the third guide slot, and
when the guide pin is moved from the third guide slot towards the connection slot, the guide pin is locked to the stop portion.

* * * * *